(12) United States Patent
Shvartsman

(10) Patent No.: US 11,263,410 B2
(45) Date of Patent: Mar. 1, 2022

(54) METHODS AND SYSTEMS TO GENERATE A TOKEN

(71) Applicant: ROCKET FINANCIAL CORPORATION, Toronto (CA)

(72) Inventor: Michael Shvartsman, Hollywood, FL (US)

(*) Notice: Subject to any disclaimer, the term of this patent is extended or adjusted under 35 U.S.C. 154(b) by 0 days.

(21) Appl. No.: 16/837,035

(22) Filed: Apr. 1, 2020

(65) Prior Publication Data

US 2020/0327288 A1 Oct. 15, 2020

Related U.S. Application Data

(60) Provisional application No. 62/832,465, filed on Apr. 11, 2019.

(51) Int. Cl.
| | |
|---|---|
| *G06F 7/00* | (2006.01) |
| *G06K 7/00* | (2006.01) |
| *G06K 7/10* | (2006.01) |
| *G06K 7/14* | (2006.01) |
| *G06K 9/18* | (2006.01) |
| *G06Q 10/06* | (2012.01) |

(52) U.S. Cl.
CPC ....... *G06K 7/0008* (2013.01); *G06K 7/10237* (2013.01); *G06K 7/1413* (2013.01); *G06K 7/1417* (2013.01); *G06K 9/183* (2013.01); *G06Q 10/063114* (2013.01)

(58) Field of Classification Search
CPC ............. G06K 7/0008; G06K 7/10237; G06K 7/1413; G06K 9/183

USPC .......................................... 235/376
See application file for complete search history.

(56) References Cited

U.S. PATENT DOCUMENTS

| | | | |
|---|---|---|---|
| 7,447,494 B2 | 11/2008 | Law et al. | |
| 9,239,719 B1* | 1/2016 | Feinstein | .................. G06F 8/70 |
| 2013/0254117 A1* | 9/2013 | von Mueller | ....... G06Q 20/3829 |
| | | | 705/71 |
| 2015/0302361 A1 | 10/2015 | Liang et al. | |
| 2017/0060572 A1* | 3/2017 | Sripathan | .................. G06F 8/70 |
| 2020/0211002 A1* | 7/2020 | Steinberg | .............. H04L 9/3213 |

OTHER PUBLICATIONS

Extended European Search Report (EESR)—Application No. EP 20165952.1—dated Jul. 17, 2020.

\* cited by examiner

*Primary Examiner* — Ahshik Kim
(74) *Attorney, Agent, or Firm* — Nyssa Inc.

(57) ABSTRACT

There is provided a method including generating an initial token being associated with a given context, and sending the initial token to a destination device. The method also includes receiving a scanned token generated by a mobile device scanning an output of the destination device. The output may be generated based on the initial token. In addition, the method includes authenticating the scanned token by comparing the scanned token to the initial token. Furthermore, the method includes generating a productivity indicator based on the scanned token, and outputting the productivity indicator.

24 Claims, 5 Drawing Sheets

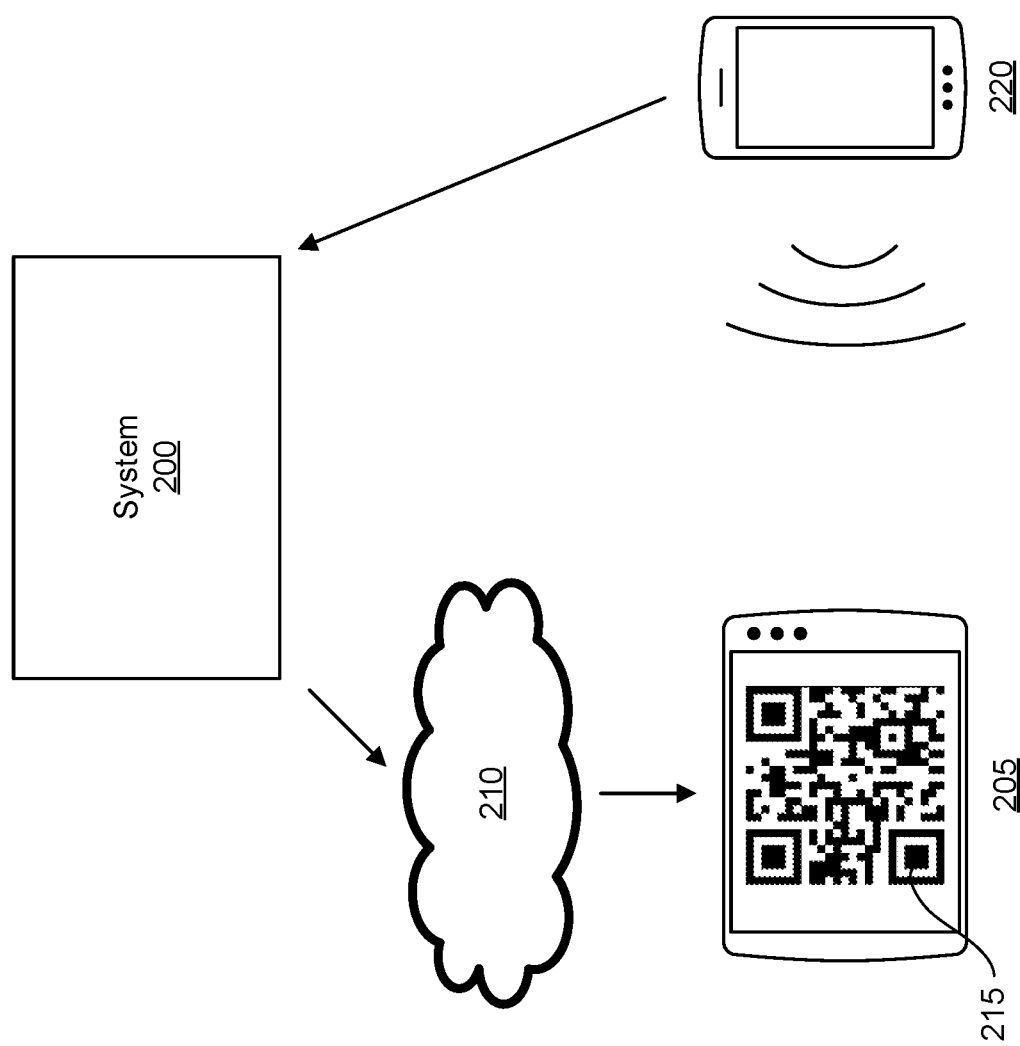

METHODS AND SYSTEMS TO GENERATE A TOKEN

CROSS-REFERENCE TO RELATED APPLICATION

This application claims the benefit of, and priority from, U.S. Provisional Patent Application No. 62/832,465 filed on Apr. 11, 2019, which is incorporated herein by reference in its entirety.

FIELD

The present specification relates to methods and systems to generate a token, and in particular to methods and systems to generate a token used to generate an output scannable by a mobile device.

BACKGROUND

Mobile devices may be used to send and receive information. Such devices may have input terminals to receive input and output terminals to output information. Mobile devices may be portable, and carried by users or operators during their daily activities.

SUMMARY

According to an implementation of the present specification there is provided a method comprising: generating an initial token being associated with a given context; sending the initial token to a destination device; receiving a scanned token generated by a mobile device scanning an output of the destination device, the output generated based on the initial token; authenticating the scanned token by comparing the scanned token to the initial token; generating a productivity indicator based on the scanned token; and outputting the productivity indicator.

The initial token may comprise one or more of: a barcode token; a QR™ code token; an audio token; a visual token; a haptic token; and a near field communication (NFC) token.

The initial token may be unique to the given context.

The mobile device scanning the output of the destination device may comprise an input terminal of the mobile device detecting the output, the input terminal comprising one or more of: a camera, a microphone, an accelerometer, a gyroscope, and an antenna.

The given context may comprise a task.

The generating the productivity indicator may comprise generating a completion identifier associated with the task.

The given context may comprise a first time.

The method may further comprise: generating a subsequent token being unique to a second time; sending the subsequent token to a further destination device; receiving a further scanned token generated by the mobile device scanning a corresponding output of the further destination device, the corresponding output generated based on the subsequent token; and authenticating the further scanned token by comparing the further scanned token to the subsequent token.

The generating the productivity indicator may comprise generating a productivity duration calculated by determining a time duration extending between the first time and the second time.

The further destination device may be the same as the destination device.

The method may further comprise: receiving a biometric identifier associated with the scanned token; and authenticating the biometric identifier to determine an operator associated with the biometric identifier.

The receiving the biometric identifier may comprise receiving the biometric identifier generated by the mobile device scanning a biometric attribute of the operator.

The receiving the biometric identifier may comprise receiving the biometric identifier generated by the destination device scanning a biometric attribute of the operator.

According to another implementation of the present specification there is provided a system comprising: a memory to store an initial token being associated with a given context; and a processor in communication with the memory. The processor is to: generate the initial token; send the initial token to a destination device; receive a scanned token generated by a mobile device scanning an output of the destination device, the output generated based on the initial token; authenticate the scanned token by comparing the scanned token to the initial token stored in the memory; generate a productivity indicator based on the scanned token; and output the productivity indicator.

The initial token may comprise one or more of: a barcode token; a QR™ code token; an audio token; a visual token; a haptic token; and an NFC token.

The initial token may be unique to the given context.

The mobile device scanning the output of the destination device may comprise an input terminal of the mobile device detecting the output, the input terminal comprising one or more of: a camera, a microphone, an accelerometer, a gyroscope, and an antenna.

The given context may comprise a task.

To generate the productivity indicator the processor may be to generate a completion identifier associated with the task.

The given context may comprise a first time.

The processor may be further to: generate a subsequent token being unique to a second time; send the subsequent token to a further destination device; receive a further scanned token generated by the mobile device scanning a corresponding output of the further destination device, the corresponding output generated based on the subsequent token; and authenticate the further scanned token by comparing the further scanned token to the subsequent token.

To generate the productivity indicator the processor may be to generate a productivity duration calculated by determining a time duration extending between the first time and the second time.

The further destination device may be the same as the destination device.

The system may further comprise the destination device in communication with the processor.

The destination device may comprise a corresponding mobile device having an output terminal to display the output.

The corresponding mobile device may further comprise a biometric scanner for scanning a biometric attribute.

The processor may be further to: receive a biometric identifier associated with the scanned token; and authenticate the biometric identifier to determine an operator associated with the biometric identifier.

To receive the biometric identifier the processor may be to receive the biometric identifier generated by the mobile device scanning a biometric attribute of the operator.

To receive the biometric identifier the processor may be to receive the biometric identifier generated by the destination device scanning a biometric attribute of the operator.

According to another implementation of the present specification there is provided a non-transitory computer-readable storage medium comprising instructions executable by a processor, the instructions to cause the processor to carry out any of the methods described herein.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 2 shows an example application of the methods described herein, in accordance with a non-limiting implementation of the present specification.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Tracking the status of ongoing processes or the completion of tasks that have been initiated may provide information that is useful in managing the processes and the tasks. Such tracking may pose several technical challenges. For example, when the processes or tasks are numerous, ongoing or frequent tracking of their status may generate large volumes of tracking data, which in turn may take up correspondingly large amounts of communication bandwidth, processing capability, and data storage capacity. In addition, various systems or organizations may use different schemes to collect and store the tracking data, which in turn may make it difficult to gather or aggregate the data from or share the data between different systems or organizations.

Figure 1:
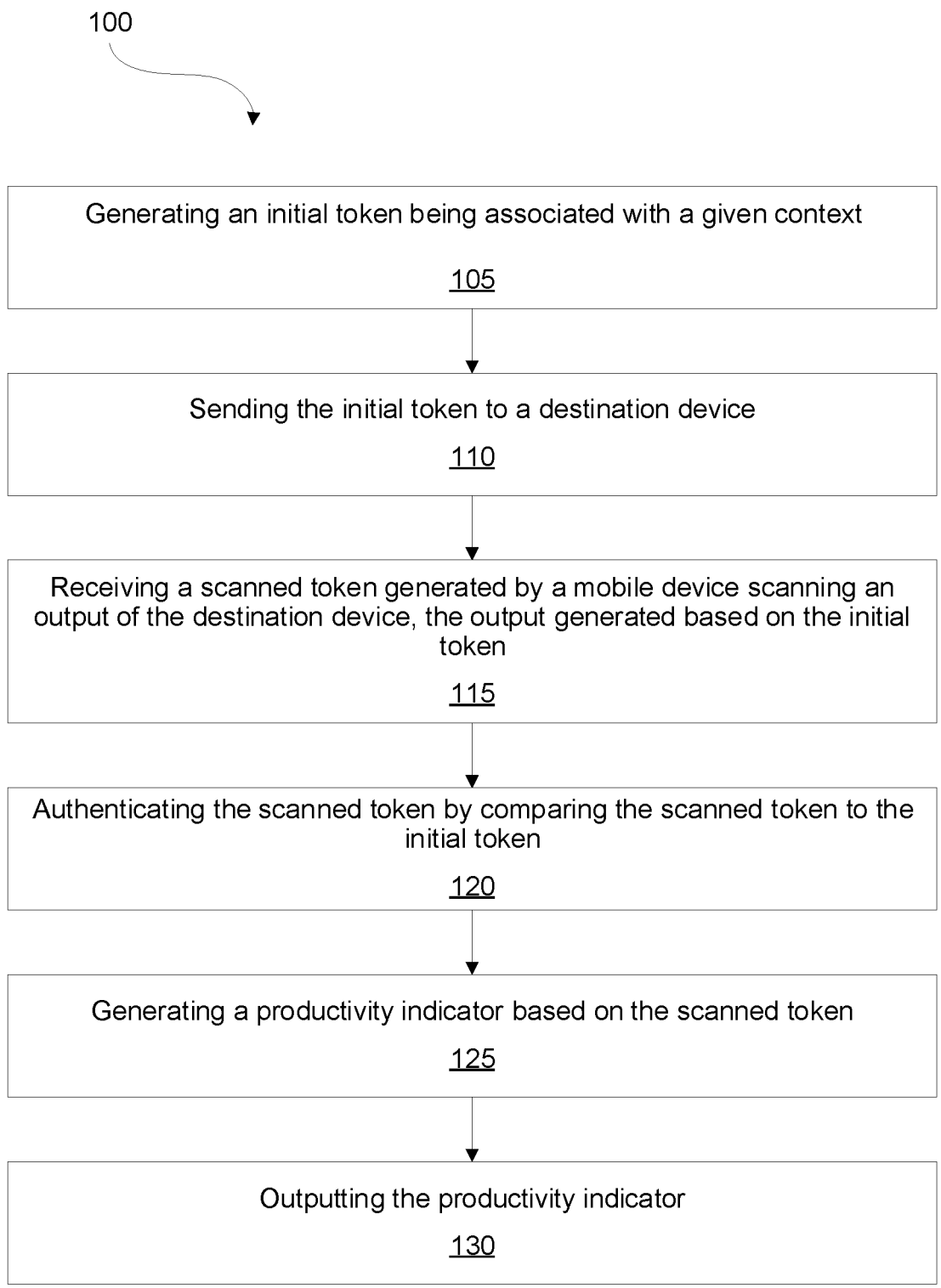
FIG. 1 shows a flowchart of an example method, in accordance with a non-limiting implementation of the present specification.

To address these technical challenges, methods or systems for tracking the status of ongoing processes or the completion of tasks may be used, which methods or systems may be different than or independent from the specific schemes used by a given system or organization to collect and store the tacking data. FIG. 1 shows a flowchart of an example method 100, which may be used to track the status of a process or the completion of a task. At box 105 an initial token is generated, which initial token is associated with a given context. In some examples the given context may comprise a task. Examples of such a task may include a vehicle ride or trip, a delivery of food or a package, and the like. Moreover, in some examples, the context may comprise a time, such as the start time or end time for an activity or work shift, and the like. It is also contemplated that in some examples the context may comprise other types of tasks or timed activities, or that the context may be other than a task or a timed activity. Timed activities may also be referred to as time-based activities.

At box 110, the initial token is sent to a destination device. The destination device may then generate an output based on the initial token, which output may be scannable by a mobile device. In some examples the destination device may comprise a mobile device such as a tablet, a smartphone, and the like. Moreover, in some examples the destination device may comprise a computer, a laptop, or another device having an output terminal to generate the output. This output may then be scanned by a mobile device. In some examples the mobile device may comprise a smartphone or other mobile or smart device of an operator active in or otherwise associated with the given context. In examples where the given context comprises a task or a time, the operator may be undertaking the task or involved in the timed activity such as shift work and the like.

The initial token may comprise instructions to allow the destination device to generate the output. In some examples these instructions may be digital or analog. For example, the initial token may comprise data, a data structure, a data packet, a digital or analog signal or signal data, and the like. In some examples the initial token may comprise a visual token which may allow or instruct the destination device to generate a corresponding visual output. For example, the initial token may comprise a barcode token to allow or instruct the destination device to generate a barcode as the output. Moreover, in some examples the initial token may comprise a QR™ code token to allow or instruct the destination device to generate a QR™ code output. Other types of visual tokens and their corresponding visual outputs are also contemplated.

In some examples, the initial token may comprise an audio token, a haptic token, a near field communication (NFC) token, and the like, which may in turn allow or instruct the destination device to generate a corresponding audio output, haptic output, NFC output, and the like respectively. It is contemplated that other types of initial tokens and corresponding types of output may also be used.

Moreover, the initial token may be associated with the given context. For example, the initial token may include or encode information about the given context. Moreover, in some examples the initial token may be stored in association with, or otherwise associated with, the given context. In this manner the initial token may be used to track the status, progress, or completion of tasks or timed activities that may be part of the given context. Furthermore, in some examples, the initial token may be unique or exclusive to the given context.

In some examples the initial token may be generated using a random or pseudo-random number generator. Moreover, in some examples the initial token may be generated based on the date or time associated with the given context or the date or time when the initial token is generated. Furthermore, in some examples the initial token may be generated in other ways such as by selecting a token from a collection of existing tokens, and the like.

Turning now to box 115, a scanned token may be received. This scanned token may be generated by the mobile device scanning the output of the destination device, which output is generated based on the initial token. As discussed above, the output may be visual, audio, haptic, NFC, and the like. In order to scan the output, an input terminal of the mobile device may detect the output. The input terminal used may correspond to the type of output to be scanned: for example, a camera of the mobile device may be used to detect a visual output, and a microphone of the mobile device may be used to detect an audio output. Similarly, an accelerometer, gyroscope, antenna, and other input terminals of the mobile device may be used to detect corresponding types of output generated by the destination device.

Upon scanning the output, the mobile device may then generate and transmit the scanned token. The scanned token may be similar to the initial token in structure, and may comprise data, a data structure, a data packet, a digital or analog signal or signal data, and the like. In some examples the mobile device may generate the scanned token from the output using the reverse of the process used by the destination device to generate the output based on the initial token.

Turning now to box 120, the scanned token may be authenticated. The authentication may be performed by comparing the scanned token to the initial token. In some examples, the scanned token may be designated as being successfully authenticated if the scanned token matches the initial token. Such a successful authentication may indicate that the mobile device had access to or was able to scan the output generated at the destination device based on the initial token.

In some examples where the context comprises a task and the initial token is generated once the task is completed, a successful authentication may be used as an indication that the operator of the mobile device has completed the task. In some examples where the context comprises a time and the initial token is generated based on a given date or time, a successful authentication may be used as a time stamp reflecting the involvement of the operator of the mobile device with a time-based activity. For example, generation of initial tokens and the subsequent authentication of the corresponding scanned tokens may be used as indications that the operator of the mobile device has started a time-based activity at a given time associated with the initial token, has reached a milestone of the time-based activity at the given time, or has completed the time-based activity at the given time. Examples of such timed or time-based activities include shift-work, wage work, hourly work, and the like.

In some examples, a biometric identifier associated with the scanned token may be used to further establish the connection of the operator with the mobile device. In other words, the biometric identifier may be used to further establish that the operator was present with the mobile device when the mobile device scanned the output of the destination device. Such a biometric identifier may be generated by the mobile device or the destination device scanning a biometric attribute of the operator.

Examples of biometric attributes include a fingerprint, an eye or part of the eye, a face or part of the face, voice, DNA, and the like. Depending on the type of biometric attribute being scanned, the mobile or destination devices may use corresponding biometric scanners to scan the biometric attributes. For example, the mobile or destination devices may comprise or use a fingerprint scanner to scan a fingerprint, an eye scanner or camera to scan the eye or a portion of the eye, a camera to perform facial recognition or a face-based scan, a microphone to scan or detect voice, a DNA sensor or chip to detect a DNA fingerprint, and the like.

Once the biometric identifier is obtained, it may be received and authenticated to determine the operator associated with the biometric identifier. This determination may in turn further establish that the operator was present when the mobile device of the operator scanned the output of the destination device. In some examples, authenticating the biometric identifier may comprise comparing the biometric identifier received from the mobile device or the destination device against a list of one or more biometric identifiers stored in association with one or more corresponding operators.

Turning now to box 125, a productivity indictor may be generated based on the scanned token. The productivity indicator may reflect the status or the progress associated with the given context. In some examples where the given context comprises a task, the productivity indicator may indicate that the task has been completed. Moreover, in some examples where the given context comprises a timed or time-based activity, the productivity indictor may indicate that the activity has commenced, has reached a milestone, or has been completed.

Furthermore, since the scanned token is generated by the mobile device scanning the output of the destination device, and the mobile device is associated with or operated by its operator, in some examples the productivity indicator may indicate the progress or productivity of the operator in relation to the given context such as the completion of a task, starting or completing a timed activity, and the like. As such, in some examples generating the productivity indicator may comprise generating a completion identifier associated with a task associated with the initial token.

In addition, in some examples the productivity indicator may comprise data, a data structure, a data packet, a digital or analog signal or signal data, and the like. At box 130, the productivity indicator may be output. To output the productivity indicator, the productivity indicator may be stored in a memory, sent to an output terminal, communicated to another component or to another system, or the like.

FIG. 2 shows an example application of the methods described herein. In FIG. 2, a system 200 may generate an initial token that is associated with a given context, such as a task or a time. In the example of FIG. 2, the initial token comprises a QR™ code token which may be used to generate or output a QR™ code. System 200 is described in greater detail in relation to FIG. 4.

System 200 may then send the initial token to a destination device 205 via a network 210. In the example of FIG. 2, destination device 205 comprises a tablet. In addition, network 210 may comprise a wireless network, a wired network, or a combination of wired and wireless networks. It is contemplated that in some examples system 200 may communicate directly with device 205, and need not communicate with device 205 via network 210. Based on the initial token, device 205 may generate an output 215. In the example of FIG. 2, output 215 comprises a QR™ code corresponding to the initial token.

A mobile device 220 may then scan or capture output 215 with its camera and generate a scanned token based on output 215. Device 220 may send the scanned token back to system 200, which may then authenticate the scanned token by comparing it with the initial token. System 200 may also generate and output a productivity indicator based on the scanned token.

In some examples, system 200 may be provided to or used by entities or organizations that provide work to operators such as the operator of mobile device 220. The initial QR™ code token may be associated with a task or a given time. The operator may then use mobile device 220 to scan the QR™ code of output 215. Mobile device 220 may in turn generate a scanned token based on output 215, which scanned token is then sent to system 200 to be authenticated. In examples where the initial QR™ code token is associated with a task, scanning output 215 and sending the corresponding scanned token to system 200 may allow the operator to confirm completion of the task. In addition, in examples where the initial QR™ code token is associated with a given time, scanning output 215 and sending the corresponding scanned token to system 200 may allow the operator to confirm starting or finishing work at the given time. In this manner, the productivity indicator generated by system 200 based on the scanned token may be used to indicate or establish the nature or number of tasks completed or the amount of time worked by the operator of mobile device 220.

In some examples, system 200 may generate a different QR™ code token periodically, such as about every 5 seconds, about every 30 seconds, and the like. In this manner, the version of the QR™ code output scanned by the mobile device of the operator may establish the time the output was scanned. This determination of the time of the scan may have an accuracy or resolution that is a function of the refresh rate or regeneration rate of the initial token. For example, if the initial token is refreshed or regenerated every 5 seconds, the scanned token may establish the time the output was scanned within 5 seconds of the actual time of the scan.

Moreover, in some examples where the initial token is refreshed or regenerated periodically, system 200 may maintain a list of the initial tokens in association with the times or time periods when each initial token was generated. This list may also be referred to as a lookup table. System 200 may then use this list to associate an authenticated scanned token with a given time.

Furthermore, in some examples system 200 may generate the initial token as a function of time according to an equation. In these examples system 200 may be able to back-calculate the time of generation based on the authenticated scanned token using the equation. In these examples, system 200 may not need to store a list or lookup table of the initial tokens in association with the times or time periods when each initial token was generated. While FIG. 2 shows a QR™ code output generated from a QR™ code token, it is contemplated that other types of initial tokens and their corresponding outputs may also be used.

In addition, in some examples one or more subsequent tokens may be generated after the generation of the initial token. This plurality of tokens may be used to track multiple tasks, or to track multiple time-based milestones related to a given time-based or timed activity. For example, referring to method 100, the given context may comprise a first time. Method 100 may further comprise generating a subsequent token associated with or unique to a second time. Other than being associated with the second time, the subsequent token may be similar to the initial token.

Then, the subsequent token may be sent to a further destination device. The further destination device may be similar to the destination device. In some examples, the further destination device and the destination device may be the same device. Next, a further scanned token may be received. The further scanned token may be generated by the mobile device scanning a corresponding output of the further destination device. The further scanned token may be similar to the scanned token. After receiving the further scanned token, the further scanned token may be authenticated by comparing the further scanned token to the subsequent token.

As the initial token is associated with the first time and the subsequent token is associated with the second time, in some examples generating the productivity indicator may comprise generating a productivity duration calculated by determining a time duration extending between the first time and the second time. In some examples, the productivity duration may correspond to an amount of time worked or to a work shift that has been completed.

Figure 3B:
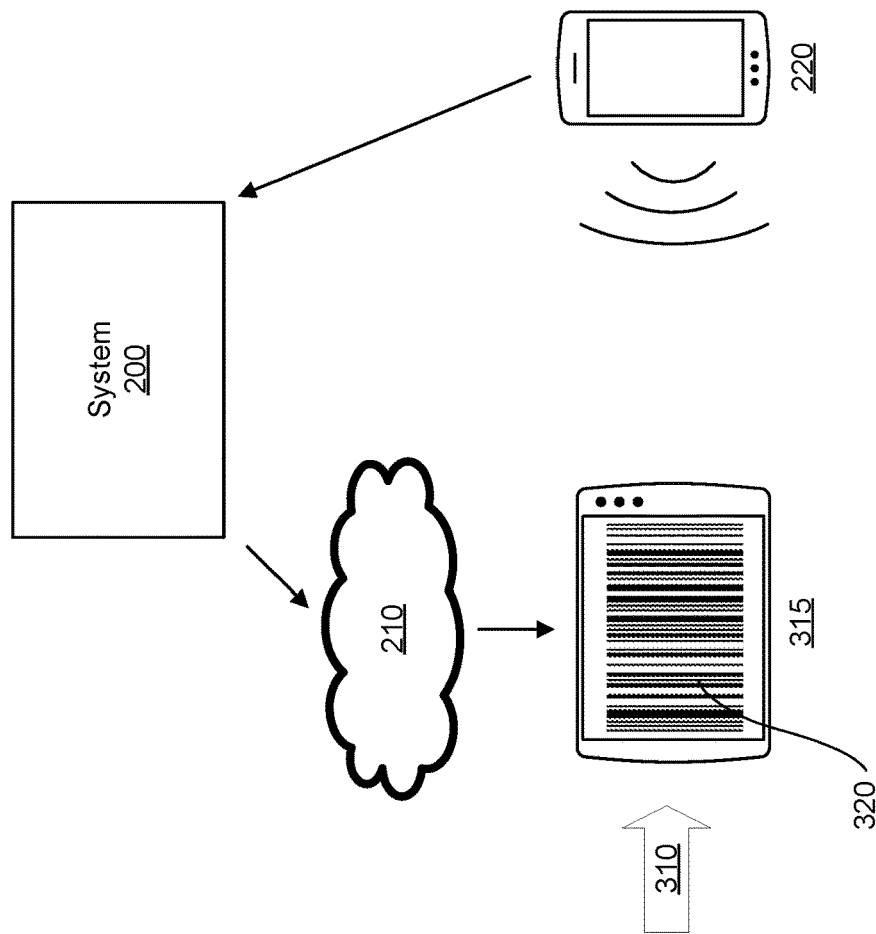
FIGS. 3A and 3B show another example application of the methods described herein, in accordance with a non-limiting implementation of the present specification.
Figure 3A:
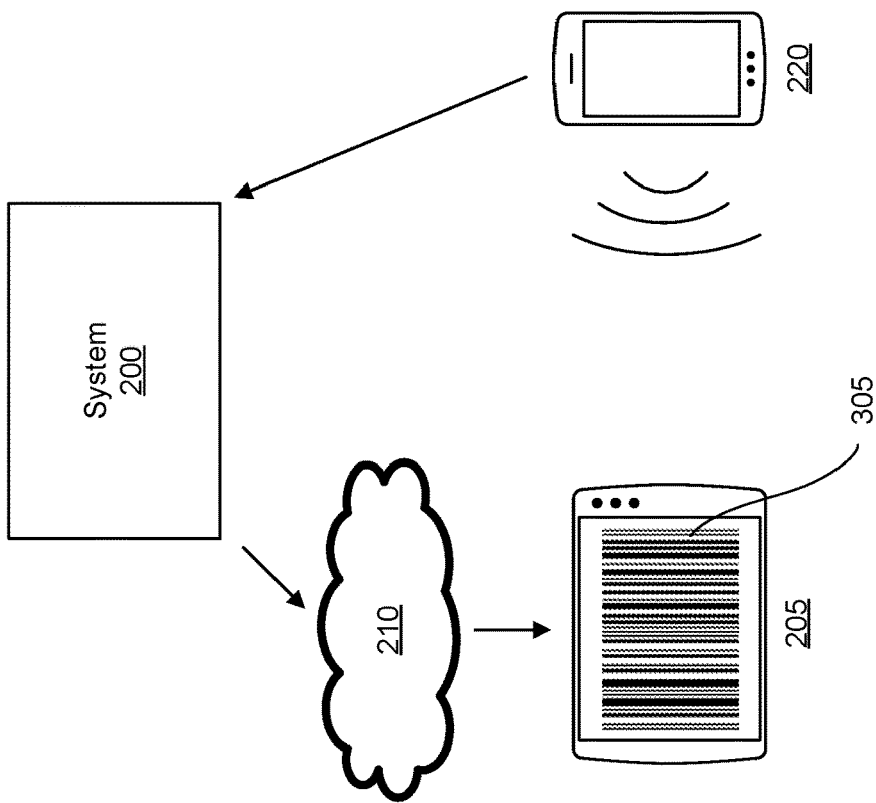

FIGS. 3A and 3B show another example application of the methods described herein, using an initial token and a subsequent token. FIG. 3A shows system 200, which may generate an initial barcode token based on which initial token destination device 205 may generate output 305. Output 305 may comprise a first barcode. Mobile device 220 may scan output 305 and generate a scanned token corresponding to the initial token.

After passage of a period of time, represented by arrow 310, system 200 may generate a subsequent token that is sent to a further destination device 315, as shown in FIG. 3B. Device 315 may be similar to device 205. In some examples, device 315 may be the same as device 205. Destination device 315, in turn, may generate an output 320 based on the subsequent token. In the example of FIG. 3B, output 320 comprises a second barcode different than the first barcode of output 305. Device 220 may then scan output 320 and generate a further scanned token that is sent to system 200.

In some examples, destination devices 205 or 315 may be present at a place where time-based work or work shifts are performed. At the beginning of a shift, the operator of mobile device 220 may use mobile device 220 to scan the barcode of output 305 to establish the start time of the operator's work shift. At the end of the work shift, the operator may use mobile device 220 to scan the barcode of output 320 to establish the end time of the operator's work shift. The time duration between the start time and the end time may represent the productivity duration of the operator's work shift. As such, system 200 and the methods described herein may be used to track the status of task- or time-based activities. While FIGS. 3A and 3B show barcode outputs generated from barcode tokens, it is contemplated that other types of initial tokens and their corresponding outputs may also be used.

System 200 may be independent of the specific status or productivity tracking schemes used in a given workplace. So long as the initial token and subsequent tokens, if any, may be provided to a destination device at the workplace and the operators at the workplace have mobile devices to scan the output of the destination device, the systems and methods described herein may be used to track the status or completion of task- or time-based activities. In this manner, the systems and methods described herein may be used to collect status or progress tracking data from different entities, organizations, or workplaces, which may otherwise use different or disparate organization-specific status tracking schemes. As such, the systems and methods described herein may be used to address some of the technical challenges associated with collecting, aggregating, and sharing status tracking data from entities, organizations, or workplaces which may use different or disparate status tracking schemes.

In addition, by providing at least some of the data communication bandwidth, data processing capability, or data storage capacity associated with collecting, processing, and storing the tracking data, the systems and methods described herein may address some of the technical challenges associated with the communicating, processing, and storing large volumes of status tracking data.

In some examples, the productivity indicators and the productivity durations described herein may provide an indication of an operator's or worker's earned-but-not-yet-paid-out wages. Moreover, in some examples a financial services provider may use the productivity indicators or the productivity durations to assess the operators or workers for eligibility to receive funds as advances or loans against their earned-but-not-yet-paid-out wages.

Figure 4:
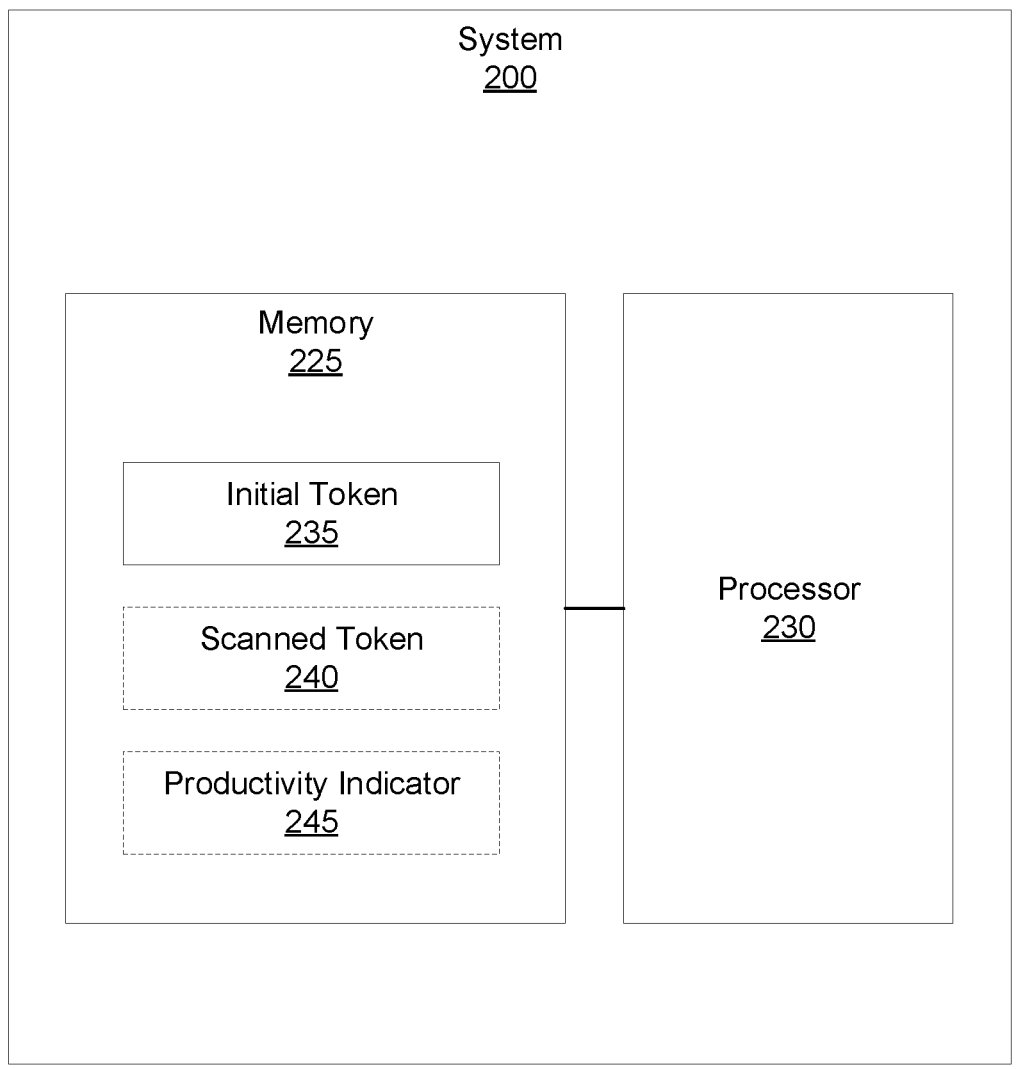
FIG. 4 shows a block diagram of an example system, in accordance with a non-limiting implementation of the present specification.

Turning now to FIG. 4, a schematic representation is show of example system 200, which may comprise a memory 225 in communication with a processor 230. Memory 225 may include a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

Processor 230, in turn, may include a central processing unit (CPU), a graphics processing unit (GPU), a microcontroller, a microprocessor, a processing core, a field-programmable gate array (FPGA), or similar device capable of executing instructions. Processor 230 may cooperate with the memory 225 to execute instructions. Processor 230 may generate an initial token 235, which may be stored in memory 225.

Processor 230 may also send initial token 235 to a destination device. In some examples, the destination device may be separate from and in communication with system 200. Moreover, in some examples the destination device may be a component of system 200 and in communication with processor 230. Furthermore, in some examples the destination device may comprise a corresponding mobile device having an output terminal to display the output. In addition, in some examples the corresponding mobile device may also comprise a biometric scanner for scanning a biometric attribute of an operator. Moreover, in some examples the operator whose biometric attribute is scanned may comprise a human operator.

Processor 230 may also receive a scanned token 240 generated by a mobile device scanning on output of the destination device. The output may be generated based on initial token 235. Moreover, the processor may authenticate scanned token 240 by comparing scanned token 240 to initial token 235 stored in memory 225. Processor 230 may then generate a productivity indicator 245 based on scanned token 240. Furthermore, processor 230 may output productivity indicator 245. To output productivity indicator 245, the productivity indicator may be stored in memory 225 or a different memory, sent to an output terminal, communicated to another component of system 200 or to another system, or the like.

In FIG. 4 scanned token 240 and productivity indicator 245 are shown in dashed lines to indicate that in some examples, scanned token 240 and productivity indicator 245 may be stored outside of memory 225 in system 200 or outside of system 200. System 200 may have features and functionality similar to those described in relation to method 100 and the other methods described herein.

Figure 5:
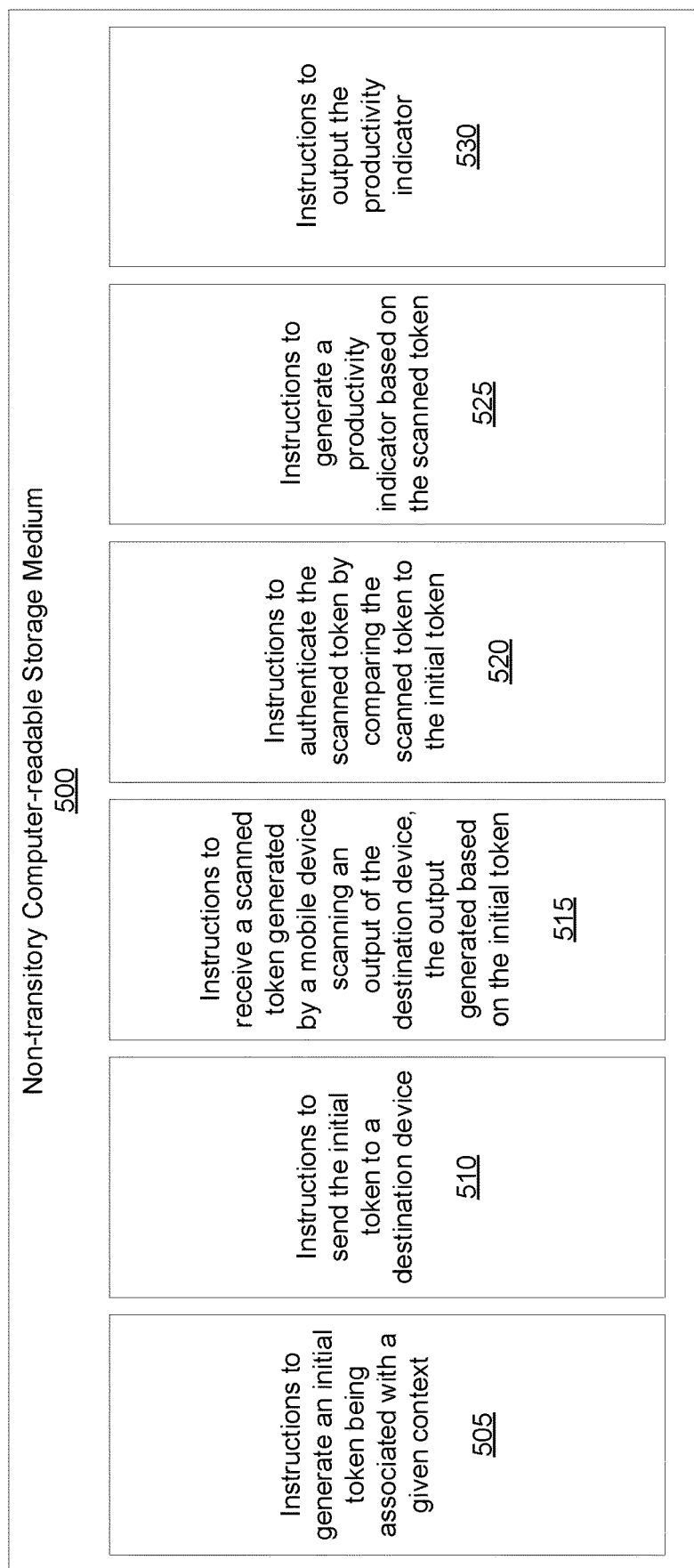
FIG. 5 shows a block diagram of an example computer-readable storage medium, in accordance with a non-limiting implementation of the present specification.

Turning now to FIG. 5, a non-transitory computer-readable storage medium (CRSM) 500 is shown, which CRSM 500 comprises instructions executable by a processor. The CRSM may comprise any electronic, magnetic, optical, or other physical storage device that stores executable instructions. The instructions may comprise instructions to cause the processor to generate an initial token being associated with a given context 505.

In addition, the instructions may comprise instructions to send the initial token to a destination device 510 and instructions to receive a scanned token generated by a mobile device scanning an output of the destination device 515. The output may be generated based on the initial token. Furthermore, the instructions may comprise instructions to authenticate the scanned token by comparing the scanned token to the initial token 520. Moreover, the instructions may comprise instructions to generate a productivity indicator based on the scanned token 525 and instructions to output the productivity indicator 530. The functions and features of the CRSM 500 may be similar to the functions and features described in relations to the methods and systems described herein.

The methods described herein may be performed using the systems described herein. In addition, it is contemplated that the methods described herein may be performed using systems different than the systems described herein. Moreover, the systems described herein may perform the methods described herein and may perform or execute the instructions stored in the CRSMs described herein. It is also contemplated that the systems described herein may perform functions or execute instructions other than those described in relation to the methods and CRSMs described herein.

Furthermore, the CRSMs described herein may store instructions corresponding to the methods described herein, and may store instructions which may be performed or executed by the systems described herein. Furthermore, it is contemplated that the CRSMs described herein may store instructions different than those corresponding to the methods described herein, and may store instructions which may be performed by systems other than the systems described herein.

The methods, systems, and CRSMs described herein may include the features or perform the functions described herein in association with any one or more of the other methods, systems, and CRSMs described herein.

Throughout this specification and the appended claims, infinitive verb forms are often used. Examples include, without limitation: "to generate," "to send," "to receive," "to authenticate," and the like. Unless the specific context requires otherwise, such infinitive verb forms are used in an open, inclusive sense, that is as "to, at least, generate," to, at least, send," "to, at least, receive," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method comprising:
   generating an initial token being associated with a given context, wherein the given context comprises a first time, the first time being a first time of day;
   sending the initial token to a first destination device;
   receiving a first scanned token generated by a mobile device scanning an output of the first destination device, the output generated based on the initial token;
   authenticating the first scanned token by comparing the first scanned token to the initial token;
   generating a productivity indicator based on the first scanned token; and
   outputting the productivity indicator.

2. The method of claim 1, wherein the initial token comprises one or more of:
   a barcode token;
   a QR™ code token;
   an audio token;
   a visual token;
   a haptic token; and
   a near field communication (NFC) token.

3. The method of claim 1, wherein the initial token is unique to the given context.

4. The method of claim 1, wherein the mobile device scanning the output of the first destination device comprises an input terminal of the mobile device detecting the output, the input terminal comprising one or more of: a camera, a microphone, an accelerometer, a gyroscope, and an antenna.

5. The method of claim 1, further comprising:
   generating a subsequent token being unique to a second time, the second time being a second time of day;
   sending the subsequent token to a second destination device;
   receiving a second scanned token generated by the mobile device scanning a corresponding output of the second destination device, the corresponding output generated based on the subsequent token; and
   authenticating the second scanned token by comparing the second scanned token to the subsequent token.

6. The method of claim 5, wherein the generating the productivity indicator comprises generating a productivity duration calculated by determining a time duration extending between the first time and the second time.

7. The method of claim 5, wherein the second destination device is the same as the first destination device.

8. The method of claim 1, further comprising:
   receiving a biometric identifier associated with the first scanned token; and
   authenticating the biometric identifier to determine an operator associated with the biometric identifier.

9. The method of claim 8, wherein the receiving the biometric identifier comprises receiving the biometric identifier generated by the mobile device scanning a biometric attribute of the operator.

10. The method of claim 8, wherein the receiving the biometric identifier comprises receiving the biometric identifier generated by the first destination device scanning a biometric attribute of the operator.

11. A system comprising:
    a memory to store an initial token being associated with a given context, wherein the given context comprises a first time, the first time being a first time of day;
    a processor in communication with the memory, the processor to:
    generate the initial token;
    send the initial token to a first destination device;
    receive a first scanned token generated by a mobile device scanning an output of the first destination device, the output generated based on the initial token;
    authenticate the first scanned token by comparing the first scanned token to the initial token stored in the memory;
    generate a productivity indicator based on the first scanned token; and
    output the productivity indicator.

12. The system of claim 11, wherein the initial token comprises one or more of:
    a barcode token;
    a QR™ code token;
    an audio token;
    a visual token;
    a haptic token; and
    an NFC token.

13. The system of claim 11, wherein the initial token is unique to the given context.

14. The system of claim 11, wherein the mobile device scanning the output of the first destination device comprises an input terminal of the mobile device detecting the output, the input terminal comprising one or more of: a camera, a microphone, an accelerometer, a gyroscope, and an antenna.

15. The system of claim 11, wherein the processor is further to:
    generate a subsequent token being unique to a second time, the second time being a second time of day;
    send the subsequent token to a second destination device;
    receive a second scanned token generated by the mobile device scanning a corresponding output of the second destination device, the corresponding output generated based on the subsequent token; and
    authenticate the second scanned token by comparing the second scanned token to the subsequent token.

16. The system of claim 15, wherein to generate the productivity indicator the processor is to generate a productivity duration calculated by determining a time duration extending between the first time and the second time.

17. The system of claim 15, wherein the second destination device is the same as the first destination device.

18. The system of claim 11, further comprising the first destination device in communication with the processor.

19. The system of claim 18, wherein the first destination device comprises a corresponding mobile device having an output terminal to display the output.

20. The system of claim 19, wherein the corresponding mobile device further comprises a biometric scanner for scanning a biometric attribute.

21. The system of claim 11, wherein the processor is further to:
receive a biometric identifier associated with the first scanned token; and
authenticate the biometric identifier to determine an operator associated with the biometric identifier.

22. The system of claim 21, wherein to receive the biometric identifier the processor is to receive the biometric identifier generated by the mobile device scanning a biometric attribute of the operator.

23. The system of claim 21, wherein to receive the biometric identifier the processor is to receive the biometric identifier generated by the first destination device scanning a biometric attribute of the operator.

24. A non-transitory computer-readable storage medium comprising instructions executable by a processor, the instructions to cause the processor to:
generate an initial token being associated with a given context, wherein the given context comprises a first time, the first time being a first time of day;
send the initial token to a first destination device;
receive a first scanned token generated by a mobile device scanning an output of the first destination device, the output generated based on the initial token;
authenticate the first scanned token by comparing the first scanned token to the initial token;
generate a productivity indicator based on the first scanned token; and
output the productivity indicator.

* * * * *